United States Patent
Edlund et al.

(10) Patent No.: US 7,003,735 B2
(45) Date of Patent: Feb. 21, 2006

(54) CALENDAR DESKTOP GRAPHICAL USER INTERFACE (GUI) FOR COMPUTER WORKSTATIONS, PERSONAL COMPUTERS, AND PERSONAL DIGITAL ASSISTANTS

(75) Inventors: Stefan B. Edlund, Sunnyvale, CA (US); Daniel A. Ford, Los Gatos, CA (US); Joseph J. Gebis, Berkeley, CA (US); Qi Lu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 09/819,654

(22) Filed: Mar. 29, 2001

(65) Prior Publication Data

US 2002/0140733 A1    Oct. 3, 2002

(51) Int. Cl.
*G06F 3/00* (2006.01)
(52) U.S. Cl. .................. 715/810; 715/963; 715/708; 715/739; 715/742; 715/825; 715/845; 715/853
(58) Field of Classification Search ................ 715/845, 715/853, 825, 742, 739, 708, 963, 866, 826, 715/810, 778, 765, 764
See application file for complete search history.

(56) References Cited

U.S. PATENT DOCUMENTS

| | | | |
|---|---|---|---|
| 5,790,974 A * | 8/1998 | Tognazzini | 455/456.5 |
| 5,842,009 A * | 11/1998 | Borovoy et al. | 707/1 |
| 5,842,177 A | 11/1998 | Haynes et al. | |
| 5,845,263 A | 12/1998 | Camaisa et al. | |
| 5,855,006 A | 12/1998 | Huemoeller et al. | |
| 5,860,067 A | 1/1999 | Onda et al. | |
| 5,895,451 A | 4/1999 | Yamade et al. | |
| 5,898,431 A | 4/1999 | Webster et al. | |
| 5,899,979 A | 5/1999 | Miller et al. | |
| 5,936,625 A | 8/1999 | Kahl et al. | |
| 5,943,051 A | 8/1999 | Onda et al. | |
| 5,970,466 A | 10/1999 | Detjen et al. | |
| 6,018,343 A | 1/2000 | Wang et al. | |
| 6,034,683 A | 3/2000 | Mansour et al. | |
| 6,369,840 B1 * | 4/2002 | Barnett et al. | 345/853 |
| 6,441,836 B1 * | 8/2002 | Takasu et al. | 345/835 |

OTHER PUBLICATIONS

Time-Variable Event-Contingent Calendars. IBM Technical Disclosure Bulletin. Mar. 1994. vol. 37, Issue 3, pp. 245-246.*

Microsoft Outlook 2000 SR-1. Microsoft Corporation. 1999. Screenshots.*

* cited by examiner

*Primary Examiner*—Cao (Kevin) Nguyen
*Assistant Examiner*—Michael Roswell
(74) *Attorney, Agent, or Firm*—Gibb I.P. Law Firm, LLC; Alison D. Mortinger, Esq.

(57) ABSTRACT

A structure and method for supplying a graphic user interface for a computer. The graphic user interface comprises a schedule having at least one time slot identifying at least one activity and at least one link associated with the activity. The link starts at least one computer program and opens a computer file associated with the activity.

27 Claims, 3 Drawing Sheets

|   | 1 | 2 | 3 10:00 -Board meeting [A] | 4 | 5 | 6 |
|---|---|---|---|---|---|---|
| 7 | 8 9:00 sales Presentation [B] | 9 | 10 | 11 | 12 | 13 |
| 14 | 15 | 16 | 17 | 18 12:00- Staff lunch [C] | 19 | 20 |
| 21 | 22 | 23 | 24 | 25 | 26 | 27 |
| 28 | 29 | 30 | 31 |   |   |   |

Figure 1

10:00 - Manager meeting [D]
12:00 - Lunch [E]
1:00 - Prepare for Presentation [F]
4:00 - Return Phone Calls [G]
6:00 - Pick up spouse at airport [Arrival Time 5:57pm] — 20

Figure 2

CALENDAR DESKTOP GRAPHICAL USER INTERFACE (GUI) FOR COMPUTER WORKSTATIONS, PERSONAL COMPUTERS, AND PERSONAL DIGITAL ASSISTANTS

BACKGROUND OF THE INVENTION

1. Field of the Invention

This invention generally relates to graphic user interfaces (GUIs) and more particularly to a GUI that presents a computer user with an alternative organization that dynamically structures their use of the computer, based upon the user's scheduled activities, their pending work and the current time.

2. Description of the Related Art

Conventional systems utilize a program driven GUI that includes icons that are selected to begin various programs, such as word processing programs and presentation programs. The problem of presenting the resources of a computer in an easy to access format has been previously solved by graphical user interfaces (GUI's) that present a "desktop" metaphor to a user (e.g., Windows 95/98, Windows NT, Windows CE, OS/2, X-Windows). In this solution/metaphor, the computer screen represents the top of a desk and the rectangular figures on the screen (icons/application windows) represent pieces of "paper". The collection and arrangement of icons and windows on the screen is usually arbitrary. For the case of icons, their physical placement on the screen/desktop is relatively static and usually only changed by direct manual manipulation by the user. Further, the set of icons on the screen is also usually only changed by direct manual user intervention. The creation of application "windows" is somewhat more dynamic in previous solutions, but usually occurs only due to direct manual invocation of an application by a user.

However, such systems are somewhat cumbersome as there is no means to have the desktop automatically select appropriate icons to match a user's scheduled task(s). A better solution (the inventive solution) is to have the interface adapt to the user such that all of the resources needed to complete the task at hand are prominently displayed and easily accessible. As discussed in greater detail below, the invention overcomes these problems by changing the model used by the desktop metaphor from a static collection of manually placed icons, to one that dynamically changes the collection of icons and other resources to match the schedule of the user.

SUMMARY OF THE INVENTION

It is, therefore, an object of the present invention to provide a structure and method for supplying a graphic user interface for a computer. The graphic user interface comprises a schedule having at least one time slot identifying at least one activity and at least one link associated with the activity that occupies the entire viewable surface of the GUI. The link starts at least one computer program and opens a computer file associated with the activity.

The link appears on the schedule in the time slot. The schedule can be a calendar. The time slot can include real time location information relating to the activity. The time slot can dynamically change an appointment time of the activity depending upon the location information.

The activity can comprise a meeting and the computer file would comprises documents used at the meeting. Alternatively, the activity could comprise Internet searching and the computer file would comprise a link history of the Internet searching. Also, the activity could comprises a meal and the computer program would comprises a virtual menu having links and automated telephone connections to food establishments.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a schematic diagram of a desktop according to the invention;

FIG. 2 is a schematic diagram of a desktop according to the invention;

DETAILED DESCRIPTION OF PREFERRED EMBODIMENTS OF THE INVENTION

Figure 3:
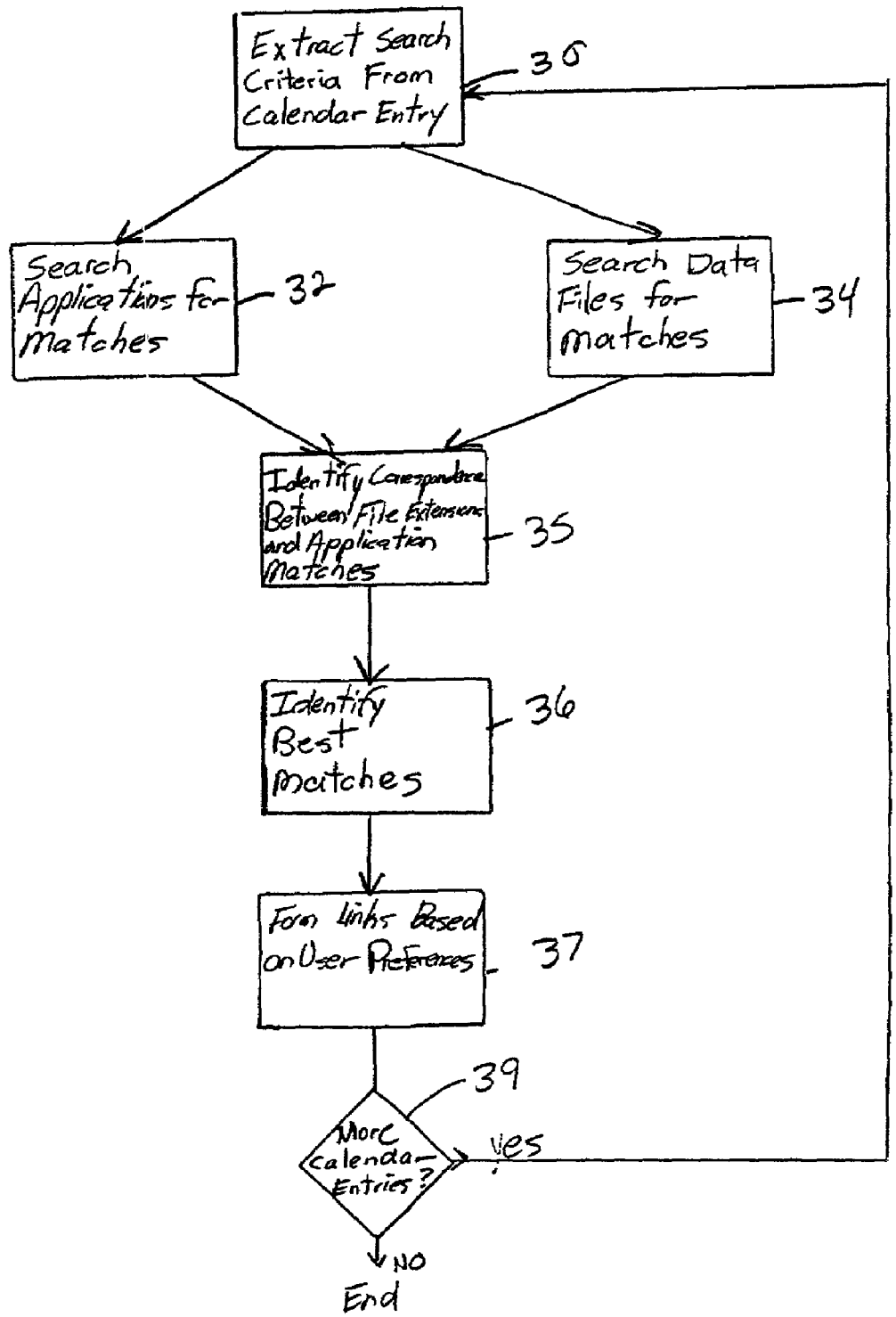
FIG. 3 is a flowchart illustrating one feature of the invention.

The purpose of this invention is to present a computer user with an alternative organization of the user interface that dynamically structures their use of the computer, based upon their scheduled activities, their pending work and the current time. In this new interface, icons representing applications and other computer resources are automatically selected, arranged, and grouped based upon the needs of previously scheduled activities.

An example implementation of this interface resembles a page from a daily calendar. Examples of the inventive desktop are shown in FIGS. 1 and 2. More specifically, the desktop in FIG. 1 is a monthly calendar and FIG. 2 is a daily calendar. In a preferred embodiment of the invention the calendar is the only item on the screen and no other icons are included on the desktop and all files/programs are accessed from the calendar desktop. In other words, the calendar occupies the entire viewable surface of the Graphic User interface and is the point from which all other applications are launched. Icons are shown as items A–H, and, for example, icon A starts a program (e.g., a word processor) associated with documents (e.g., an agenda and other reports) to be used at the board meeting at 10:00 on the 3rd of a given month, as shown in FIG. 1.

With the invention each time slot has an indication of the activity scheduled for that period, for instance a meeting with a particular person, but, in addition the entry would contain links (icons) and windows (applications) that are useful for that activity. For instance as shown in FIG. 2, a user may have a meeting from 10 to 11 a.m., lunch from 12 to 1 p.m., from 1 p.m. to 3 p.m., a plan to work on a business presentation, plans to return the days phone calls from 4 p.m. to 5 p.m. and is scheduled to pick up his/her spouse at the airport at 6 p.m.

The icon(s) in the calendar for the 10 a.m. meeting would contain links to recent e-mail messages exchanged about the meeting subject so the user can refresh their memory quickly. The lunch slot icon(s) would contain the current menu of the cafeteria or a link to order from a local deli. The 1 p.m. slot would have a link to the appropriate Freelance or Power Point file ready to be opened. The 6 p.m. slot would contain a (small) application window 20 that dynamically updates the arrival time or the current location of the user's spouse and the status of the flight (e.g., a small map of the world with an aircraft icon showing the current location of the plane and its ETA).

In one embodiment, the unscheduled time period slot(s) contain icons to applications and resources for tasks that are not scheduled, but are known by the system (e.g., from a "to do" list) to be possible candidates for the user to work on. The "to do" list is available to the desktop interface through a "standards" based interface such as "iCalendar" (IEFT RFC 2445 "Internet Calendaring and Scheduling Core Object Specification", IEFT RFC 2446 "iCalendar Transport-Independent Interoperability Protocol (iTIP) Scheduling Events, Busy-time, To-dos and Journal Entries", IEFT RFC 2447 "iCalendar message-Based Interoperability Protocol (iMIP)), or other more proprietary interfaces likely linked directly to a vendor's products. In either case, the collection of possible tasks can be examined by the interface and suitable candidates extracted. These can then be entered into "free time" slots in the user's desktop calendar interface as suggestions for possible tasks to work on. For instance, a "to do" item that says "complete customer presentation" results in the invention automatically adding a link to a presentation graphics application such as PowerPoint or Freelance to the calendar in an otherwise unscheduled time period.

If the entry in the calendar was previously associated with a specific application and specific data files, the invention creates links to that specific application and those data files. However, if the calendar entry is not previously associated with an application, the invention automatically adds links to the appropriate application (and necessary data files) by searching the available file systems based on the terms within the calendar entry. The invention extracts search criteria from the calendar entry and performs a search within the user's computer system (and network) based upon the search criteria. The invention that automatically creates links to the application(s) and/or data file(s) that matched in the search criteria.

For example, if the calendar entry reads "Work on VLDB Presentation" the invention identifies the word "presentation" and associates a presentation program such as PowerPoint, Freelance, etc. with the calendar entry by creating links. Similarly, the invention identifies the term "VLDB" as search criteria. Then, the invention searches data files for the term "VLDB". If the data files which match the search criteria are associated with a certain presentation program (e.g., based on file extension), the invention forms links with the data file and the presentation program. To the contrary, if the data files are associated with a different application (e.g., a wordprocessing application, spreadsheet application, etc.), the invention forms links with that different application.

If the search returns multiple matches, the invention creates a link for the application and data files that contain the most matches. Therefore, the invention would preferably create links for data files that include the term "VLDB" and that were created with a presentation program. If the search does not produce a result which clearly stands out as having the most matches, multiple links can be formed to provide the user with a choice of which data file or application to utilize. On the other hand, if no data files matched the search criteria, the invention would simply create a link to multiple presentation programs or a single link to the users favorite presentation program (based upon a previously tracked amount of usage or upon a previous identification of the user's favorite program).

The invention is designed to accommodate different user's preferences. More specifically, the invention allows users to choose whether a single link, a small number of links or a large number of links will be automatically created for each calendar entry. Therefore, a user who performs a wide variety and activities using many different applications may decide that a large number of links should be created. To the contrary, a user who performs very repetitive tasks may decide that a small number of links be created. The invention uses these preferences to broaden or narrow the search results so as to accommodate the user's needs.

Referring now to FIG. 3, a flowchart illustrates how the invention automatically adds links and associates applications with scheduled activities. The processing begins by extracting search criteria from the calendar entry as shown in item 30. As mentioned above, the text of the calendar entry can be utilized to create search criteria. The invention then searches the applications that are available to the user (on a local or network system) as shown in item 32. Item 34 similarly illustrates a search of data files.

In a preferred embodiment only the user's data files are searched. However, additional data files can be searched. For example, if the initial search does not produce any results files of other associated individuals (e.g., co-workers, family members, etc.) may be included in the search. In one embodiment, the user is allowed to previously define which data files can be encompassed by the automatic search to improve the invention's accuracy. While items 32 and 34 are shown as separate items, depending upon system design, the searches can be combined.

Once the search is performed, the invention identifies any correspondence between the file extensions (of the matching data files) and the matching applications (item 35). As discussed above, the invention identifies the best matches in item 36 (e.g., highest number of matching terms, matching file extension and application, etc.). Finally, in item 37 the invention automatically forms links based upon the user's preferences (e.g. small number of links, a large number of links, etc.).

In one embodiment, the invention sequentially looks at each calendar entry and if there are more entries, the processing continues until all calendar entries have been linked with an appropriate application and/or data file. In a different embodiment, the links can be formed immediately after each calendar entry is made (e.g., constant link updating). Alternatively, the invention can form the links periodically (e.g., once an hour, once a day, once a week, etc.). In addition, the loop processing shown between items 39 and 30 can be eliminated and processing for all calendar entries can be performed in parallel to increase processing speed.

The inventive "Calendar Desktop" allows various features to be integrated and automated to enhance user productivity. For instance, the time slot while acting as a "container" for the resources for an activity, can also act as a link to a virtual application space where those resources are active. A miniature view of that space (e.g., the placement of application windows, etc.) is displayed as part of the slot as a vista clue. When the user clicks on the slot, the display switches to one where the resources/applications are active (e.g., the word processor would be open on the correct file).

Thus, the invention comprises a "desktop" in which the user's terminal screen is viewed as a portal that can be positioned over a number of usually small, different "desktops". This places a floating window that is visible in all of the user's desktops that shows miniature versions of all of the "virtual desktops". The user can then switch from one to the other by clicking with a mouse on any of the miniature versions. This invention extends the idea of virtual desktops by making the calendar entries serve the same role as the "desktop miniatures" so that when a user selects the entry they also cause the underlying desktop interface to change to match the entry, The invention then extends this to automatically populate the contents of that desktop with the application and resources needed to support the task specified by the entry.

The inventive Calendar Desktop can also dynamically adjust time periods to match external events. For instance, if a meeting is scheduled to start at 2 p.m., but the location of the other party is known and their estimated time of arrival is 2:10 p.m., the calendar could automatically reflect that by "stretching" the time period before the meeting so that it doesn't end until 2:10 p.m. The key to enabling this function is accurate information on the positions of participants scheduled to attend the meeting and estimates on their current speed and direction. Such information is available from commercial tracking devices such as the "PinPoint" from Airlink communication (http://www.airlink.com). This device combines a GPS receiver that provides Latitude and Longitude information with a wireless CDPD modem which provides connectivity to the Internet. It transmits a UDP packet that contains the location information to any IP address, port number combination on the Internet. The frequency with which it does this is configurable. In, the future, position information will be available from mobile telephones. The U.S. Federal Communications Commission (FCC) has mandated that future mobile telephones be able to identify their physical position so that emergency "911" phone calls can be responded to with greater efficiency. By integrating physical position reports into the Calendar system, the invention can make predictions of the arrival times of users and adjust schedules to reflect reality.

The inventive Calendar Desktop can also be used to schedule system resources, for instance, pre-caching applications on network computers. Finally, the Calendar Desktop can be used to record a user's activities and let them locate previous work or resources by simply "paging back" in the calendar. For instance, the user can find the Web page they were looking at last Thursday around lunch by simply clicking on the icon on that day and time. This is implemented in a number of ways, in the simplest case, by automatically creating a link to an application's "history file" would be sufficient, but more sophisticated implementations might reference operating system records of historical user activity.

Figure 4:
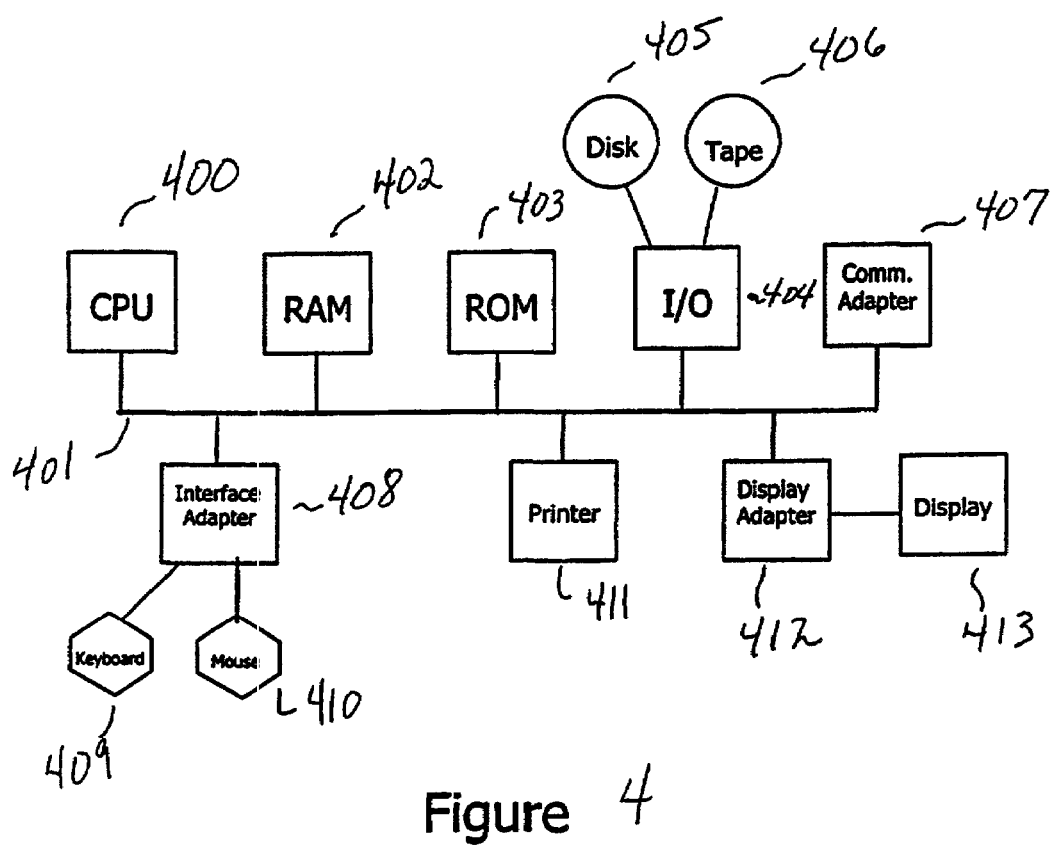
FIG. 4 is a schematic diagram of a hardware system adapted to implement the invention.
Figure 3:
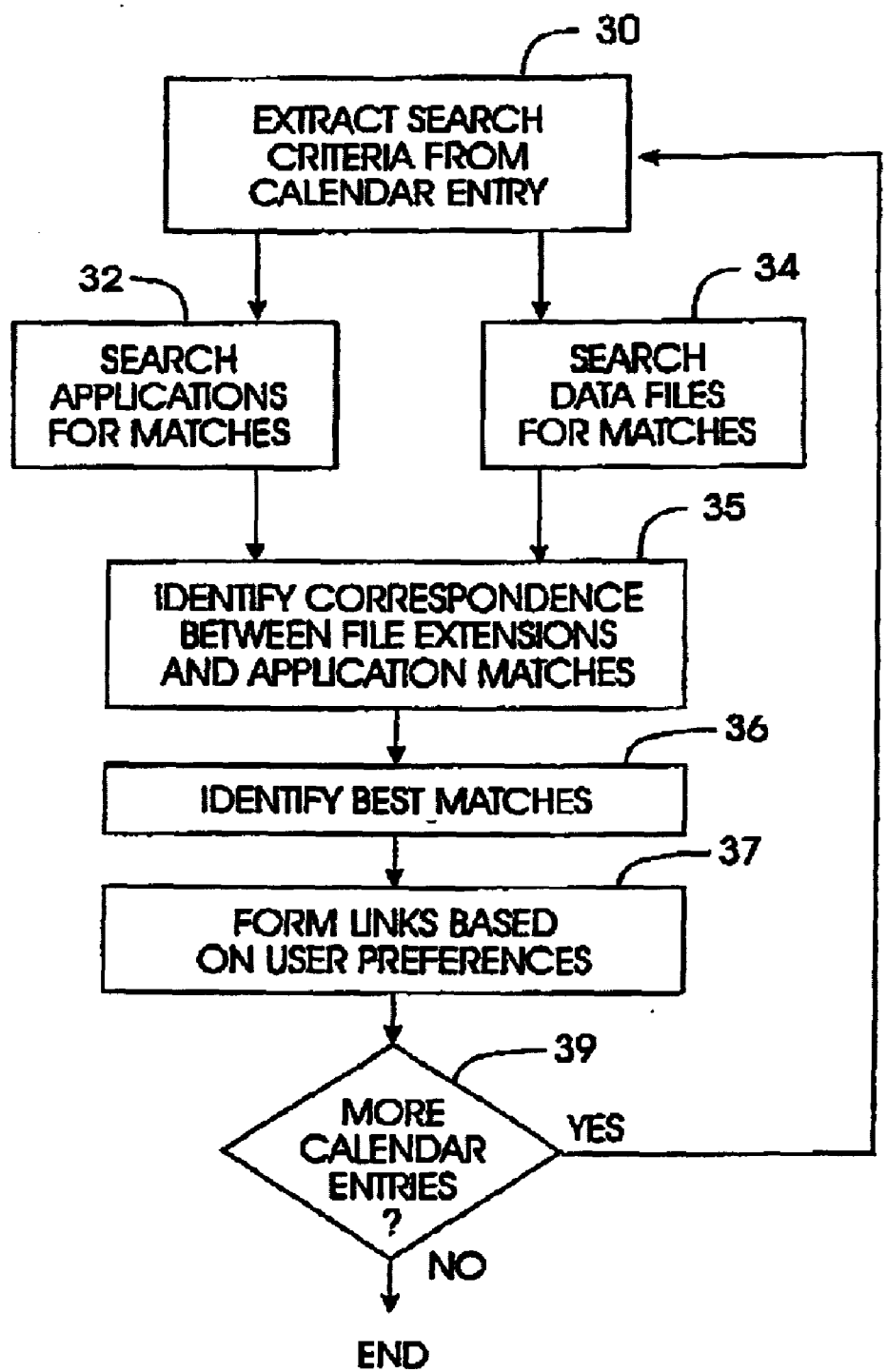
Figure 4:
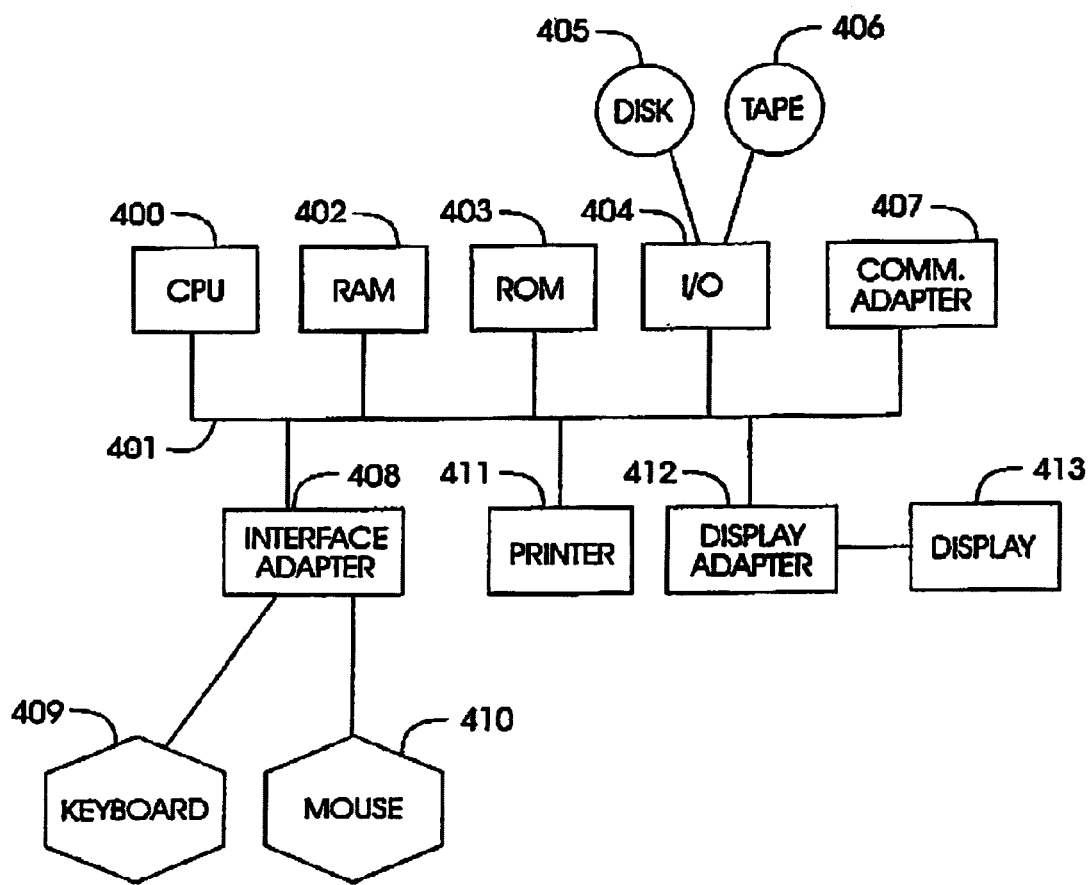

While the overall methodology of the invention is described above, the invention can be embodied in any number of different types of systems and executed in any number of different ways, as would be known by one ordinarily skilled in the art. For example, as illustrated in FIG. 4, a typical hardware configuration of an information handling/computer system in accordance with the invention preferably has at least one processor or central processing unit (CPU) 400. For example, the central processing unit 400 could include various mapping units, weighting units, classification units, clustering units, filters, adders, subtractors, comparators, etc. Alternatively, as would be known by one ordinarily skilled in the art given this disclosure, multiple specialized CPU's (or other similar individual functional units) could perform the same processing, mapping, weighting, classifying, clustering, filtering, adding, subtracting, comparing, etc.

The CPU 400 is interconnected via a system bus 401 to a random access memory (RAM) 402, read-only memory (ROM) 403, input/output (I/O) adapter 404 (for connecting peripheral devices such as disk units 405 and tape drives 406 to the bus 401), communication adapter 407 (for connecting an information handling system to a data processing network) user interface adapter 408 (for connecting peripherals 409–410 such as a keyboard, mouse, imager, microphone, speaker and/or other interface device to the bus 401), a printer 411, and display adapter 412 (for connecting the bus 401 to a display device 413). The invention could be implemented using the structure shown in FIG. 4 by including the inventive method, described above, within a computer program stored on the storage device 405. Such a computer program would act on the interface units 409–410 or through the network connection 407. The system would operate the inventive calendar desktop on the display 413, through the printer 411 or back to the network 407.

The invention dynamically organizes the computer and other resources a user needs to fit the tasks they are or will be doing. The invention proactively assembles the resources needed for a particular activity and groups them in a way that is easy for a user to locate and access. The invention solves the problem of organizing the resources needed for a particular task by first consulting a computer representation of the user's scheduled activities (e.g., Lotus Notes calendar, Microsoft Outlook calendar, Palm Pilot desktop calendar). The invention then finds, groups and presents the resources appropriate for that activity.

As discussed above, the problem of presenting the resources of a computer in an easy to access format has been previously solved by graphical user interfaces (GUI's) that present a "desktop" metaphor to a user (e.g., Windows 95/98, Windows NT, Windows CE, OS/2, X-Windows). In this solution/metaphor, the computer screen represents the top of a desk and the rectangular figures on the screen (icons/application windows) represent pieces of "paper". The collection and arrangement of icons and windows on the screen is usually arbitrary. For the case of icons, their physical placement on the screen/desktop is relatively static and is usually only changed by direct manual manipulation by the user. Further, the set of icons on the screen is also usually only changed by direct manual user intervention. The creation of application "windows" is somewhat more dynamic in previous solutions, but usually occurs only due to direct manual invocation of an application by a user.

The inventive solution adopts a "calendar page" GUI in which the computer screen represents a page (or pages) of a calendar. The "page" is divided into sections corresponding to different time periods of the day. Each section contains a description of the activity that is scheduled for that time period as well as icons and open application windows that the system has automatically determined are required or useful for the activity scheduled for that time period. Just as in GUI's that use the desktop metaphor, calendar metaphor interfaces allow application windows to expand in size and overlap the "calendar".

While the invention has been described in terms of preferred embodiments, those skilled in the art will recognize that the invention can be practiced with modification within the spirit and scope of the appended claims.

What is claimed is:

1. A graphic user interface for a computer comprising:
   a viewable surface;
   a schedule occupying all of said viewable surface and having at least one time slot containing at least one descriptive entry; and wherein said time slot dynamically changes an appointment time of said descriptive entry depending upon real time location information relating to said descriptive entry, at least one link associated with said descriptive entry, said link starting at least one computer application and opening a computer data file associated with said descriptive entry, wherein said link appears on said schedule in said time slot, wherein said schedule comprises the only point from which all other graphic user interface computer applications operating on said computer are launched.

2. The graphic user interface in claim 1, wherein said schedule comprises a calendar.

3. The graphic user interface in claim 1, wherein said descriptive entry comprises Internet searching and said computer data file comprises a link history of said Internet searching.

4. The graphic user interface in claim 1, wherein said descriptive entry has a link to an associated virtual desktop.

5. A graphic user interface for a computer comprising:
a viewable surface;
a schedule occupying all of said viewable surface and having at least one time slot containing at least one descriptive entry; and
at least one link associated with said descriptive entry, said link starting at least one computer application and opening a computer data file associated with said descriptive entry,
wherein said schedule comprises the only point from which all other graphic user interface computer applications operating on said computer are launched.

6. A graphic user interface for a computer comprising:
a schedule having at least one time slot containing at least one descriptive entry,
at least one link associated with said descriptive entry, said link starting at least one computer application and opening a computer data file associated with said descriptive entry,
wherein said link is created automatically based upon a search of data flies and applications using terms within said descriptive entry, and
wherein said schedule comprises the only point from which all other graphic user interface computer applications operating on said computer are launched.

7. The graphic user interface in claim 6, wherein said link appears on said schedule in said time slot.

8. The graphic user interface in claim 6, wherein said schedule comprises a calendar.

9. The graphic user interface in claim 6, wherein said time slot includes real time location information relating to said descriptive entry.

10. The graphic user interface in claim 6, wherein said descriptive entry comprises Internet searching and said computer file comprises a link history of said Internet searching.

11. The graphic user interface in claim 6, wherein said descriptive entry has a link to an associated virtual desktop.

12. A graphic user interface for a computer comprising:
a schedule having at least one time slot containing at least one descriptive entry; and
at least one link associated with said descriptive entry, said link starting at least one computer application and opening a computer data file associated with said descriptive entry,
wherein said link is created automatically based upon a search of data files and applications using terms within said descriptive entry, and
wherein said schedule comprises the only point from which all other graphic user interface computer applications operating on said computer are launched.

13. A method of supplying a graphic user interface for a computer, said method comprising:
providing a graphic user interface schedule, wherein said schedule comprises the only point from which all other graphic user interface computer applications operating on said computer are launched;
inputting at least one descriptive entry into at least one time slot of said schedule; and
creating at least one link associated with said descriptive entry, said link starting at least one computer application and opening a computer data file associated with said descriptive entry, wherein said link appears on said schedule in said time slot.

14. The method in claim 13, further comprising automatically creating said at least one link associated with said descriptive entry.

15. The method in claim 14, wherein said time slot includes real time location information relating to said descriptive entry.

16. The method in claim 13, wherein said schedule comprises a calendar.

17. The method in claim 13, wherein said descriptive entry comprises Internet searching and said computer file comprises a link history of said Internet searching.

18. The method in claim 13, wherein said descriptive entry has a link to an associated virtual desktop.

19. A method of supplying a graphic user interface for a computer, said method comprising:
providing a graphic user interface schedule, wherein said schedule comprises the only point from which all other graphic user interface computer applications operating on said computer are launched;
inputting at least one descriptive entry into at least one time slot of said schedule; and
automatically creating at least one link associated with said descriptive entry, said link starting at least one computer application and opening a computer data file associated with said descriptive entry.

20. A method of supplying a graphic user interface for a computer, said method comprising:
inputting at least one descriptive entry into at least one time slot; and
automatically creating at least one link associated with said descriptive entry, said link starting at least one computer application and opening a computer data file associated with said descriptive entry,
wherein said creating of said link is based upon a search of data files and applications using terms describing said descriptive entry contained within said time slot,
wherein said link comprises the only point from which all other graphic user interface computer applications operating on said computer are launched.

21. A program storage device readable by machine, tangibly embodying a program of instructions executable by said machine to perform a method for supplying a graphic user interface for a computer, said method comprising:
providing a graphic user interface schedule, wherein said schedule comprises the only point from which all other graphic user interface computer applications operating on said computer are launched;

inputting at least one descriptive entry into at least one time slot of said schedule; and creating at least one link associated with said descriptive entry, said link starting at least one computer application and opening a computer data file associated with said descriptive entry, wherein said link appears on said schedule in said time slot.

22. The program storage device in claim 21, further comprising automatically creating said at least one link associated with said descriptive entry.

23. The program storage device in claim 21, wherein said schedule comprises a calendar.

24. The program storage device in claim 21, wherein said time slot includes said real time location information relating to said descriptive entry.

25. The program storage device in claim 21, wherein said descriptive entry has a link to an associated virtual desktop.

26. A program storage device readable by machine, tangibly embodying a program of instructions executable by said machine to perform a method for supplying a graphic user interface for a computer, said method comprising:

providing a graphic user interface schedule, wherein said schedule comprises the only point from which all other graphic user interface computer applications operating on said computer are launched;

inputting at least one descriptive entry into at least one time slot of said schedule; and automatically creating at least one link associated with said descriptive entry, said link starting at least one computer application and opening a computer data file associated with said descriptive entry.

27. A program storage device readable by machine, tangibly embodying a program of instructions executable by said machine to perform a method for supplying a graphic user interface for a computer, said method comprising:

inputting at least one descriptive entry into at least one time slot; and automatically creating at least one link associated with said descriptive entry, said link starting at least one computer application and opening a computer data file associated with said descriptive entry, wherein said creating of said link is based upon a search of data files and applications using terms describing said descriptive entry contained within said time slot, wherein said link comprises the only point from which all other graphic user interface computer applications operating on said computer are launched.

* * * * *

UNITED STATES PATENT AND TRADEMARK OFFICE
CERTIFICATE OF CORRECTION

| | | |
|---|---|---|
| PATENT NO. | : 7,003,735 B2 | Page 1 of 5 |
| APPLICATION NO. | : 09/819654 | |
| DATED | : February 21, 2006 | |
| INVENTOR(S) | : Edlund et al. | |

It is certified that error appears in the above-identified patent and that said Letters Patent is hereby corrected as shown below:

Delete Title page illustrating figure and substitute new Title page illustrating figure attached.

Delete drawing sheets 1-3, and substitute drawing sheets 1-3 with the attached sheets.

Signed and Sealed this

Twenty-seventh Day of June, 2006

JON W. DUDAS
*Director of the United States Patent and Trademark Office*

(12) United States Patent
Edlund et al.

(10) Patent No.: US 7,003,735 B2
(45) Date of Patent: Feb. 21, 2006

(54) CALENDAR DESKTOP GRAPHICAL USER INTERFACE (GUI) FOR COMPUTER WORKSTATIONS, PERSONAL COMPUTERS, AND PERSONAL DIGITAL ASSISTANTS

(75) Inventors: Stefan B. Edlund, Sunnyvale, CA (US); Daniel A. Ford, Los Gatos, CA (US); Joseph J. Gebis, Berkeley, CA (US); Qi Lu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 09/819,654

(22) Filed: Mar. 29, 2001

(65) Prior Publication Data
US 2002/0140733 A1 Oct. 3, 2002

(51) Int. Cl.
*G06F 3/00* (2006.01)
(52) U.S. Cl. .................. 715/810; 715/963; 715/708; 715/739; 715/742; 715/825; 715/845; 715/853
(58) Field of Classification Search ............ 715/845, 715/853, 825, 742, 739, 708, 963, 866, 826, 715/810, 778, 765, 764
See application file for complete search history.

(56) References Cited

U.S. PATENT DOCUMENTS

| | | | |
|---|---|---|---|
| 5,790,974 A * | 8/1998 | Tognazzini | 455/456.5 |
| 5,842,009 A * | 11/1998 | Borovoy et al. | 707/1 |
| 5,842,177 A | 11/1998 | Haynes et al. | |
| 5,845,263 A | 12/1998 | Camaisa et al. | |
| 5,855,006 A | 12/1998 | Huemoeller et al. | |
| 5,860,067 A | 1/1999 | Onda et al. | |
| 5,895,451 A | 4/1999 | Yamade et al. | |
| 5,898,431 A | 4/1999 | Webster et al. | |
| 5,899,979 A | 5/1999 | Miller et al. | |
| 5,936,625 A | 8/1999 | Kahl et al. | |
| 5,943,051 A | 8/1999 | Onda et al. | |
| 5,970,466 A | 10/1999 | Detjen et al. | |
| 6,018,343 A | 1/2000 | Wang et al. | |
| 6,034,683 A | 3/2000 | Mansour et al. | |
| 6,369,840 B1 * | 4/2002 | Barnett et al. | 345/853 |
| 6,441,836 B1 * | 8/2002 | Takasu et al. | 345/835 |

OTHER PUBLICATIONS

Time-Variable Event-Contingent Calendars. IBM Technical Disclosure Bulletin. Mar. 1994. vol. 37, Issue 3, pp. 245-246.*
Microsoft Outlook 2000 SR-1. Microsoft Corporation. 1999. Screenshots.*

* cited by examiner

*Primary Examiner*—Cao (Kevin) Nguyen
*Assistant Examiner*—Michael Roswell
(74) *Attorney, Agent, or Firm*—Gibb I.P. Law Firm, LLC; Alison D. Mortinger, Esq.

(57) ABSTRACT

A structure and method for supplying a graphic user interface for a computer. The graphic user interface comprises a schedule having at least one time slot identifying at least one activity and at least one link associated with the activity. The link starts at least one computer program and opens a computer file associated with the activity.

27 Claims, 3 Drawing Sheets

| | 1 | 2 | 3 10:00 -Board Meeting [A] | 4 | 5 | 6 |
|---|---|---|---|---|---|---|
| 7 | 8 9:00 Sales Presenta- tion [B] | 9 | 10 | 11 | 12 | 13 |
| 14 | 15 | 16 | 17 | 18 12:00 Staff [C] Lunch | 19 | 20 |
| 21 | 22 | 23 | 24 | 25 | 26 | 27 |
| 28 | 29 | 30 | 31 | | | |

|   | 1 | 2 | 3<br>10:00<br>-Board<br>Meeting<br>[A] | 4 | 5 | 6 |
|---|---|---|---|---|---|---|
| 7 | 8<br>9:00<br>Sales<br>Presenta-<br>tion<br>[B] | 9 | 10 | 11 | 12 | 13 |
| 14 | 15 | 16 | 17 | 18<br>12:00<br>Staff [C]<br>Lunch | 19 | 20 |
| 21 | 22 | 23 | 24 | 25 | 26 | 27 |
| 28 | 29 | 30 | 31 |   |   |   |

*FIG. 1*

10:00 - Manager meeting [D]
12:00 - Lunch [E]
 1:00 - Prepare for presentation [F]
 4:00 - Return phone calls [G] — 20
 6:00 - Pick up spouse at airport [Arrival Time 5:57 pm]

*FIG. 2*